United States Patent [19]

Idstein

[11] 4,072,306
[45] Feb. 7, 1978

[54] SHEET FEED APPARATUS
[75] Inventor: Hermann Idstein, Oestrich-Winkel, Germany
[73] Assignee: Hoechst Aktiengesellschaft, Frankfurt am Main, Germany
[21] Appl. No.: 732,852
[22] Filed: Oct. 15, 1976
[30] Foreign Application Priority Data
  Oct. 16, 1975  Germany .............................. 2546463
[51] Int. Cl.² .......................... B65H 5/04; B65H 9/06
[52] U.S. Cl. .......................................... 271/3; 271/82; 271/132; 271/247; 271/265; 271/277; 346/138
[58] Field of Search ....................... 271/3, 80, 82, 132, 271/247, 267, 277, 265; 346/138
[56] References Cited
U.S. PATENT DOCUMENTS

| | | | |
|---|---|---|---|
| 3,203,074 | 8/1965 | Monaghan | 346/138 X |
| 3,278,179 | 10/1966 | Hartel | 271/82 X |
| 3,578,316 | 5/1971 | Watson | 271/267 |
| 3,843,114 | 10/1974 | Kojima et al. | 271/3 |
| 3,918,707 | 11/1975 | Villemer et al. | 346/138 X |

FOREIGN PATENT DOCUMENTS
  654,490  4/1929  France .................................. 271/267

Primary Examiner—Robert W. Saifer
Attorney, Agent, or Firm—Richard L. Schwaab

[57] ABSTRACT

Disclosed is a sheet feed apparatus suitable for feeding an original into a copying machine at an intake position and through the machine past an exposure station, the apparatus comprising a rotary support having a surface for supporting the original, means rotatable with the rotary support for gripping the leading edge of the original, means for selectively coupling and decoupling the gripping means with the support, means in advance of the exposure station for pressing the original against the supporting surface, means associated with the rotary support for conveying the original in contact with the supporting surface when the gripping means is stationary and means for releasing the original from the gripping means at a discharge position after the support has made a predetermined number of revolutions.

28 Claims, 7 Drawing Figures

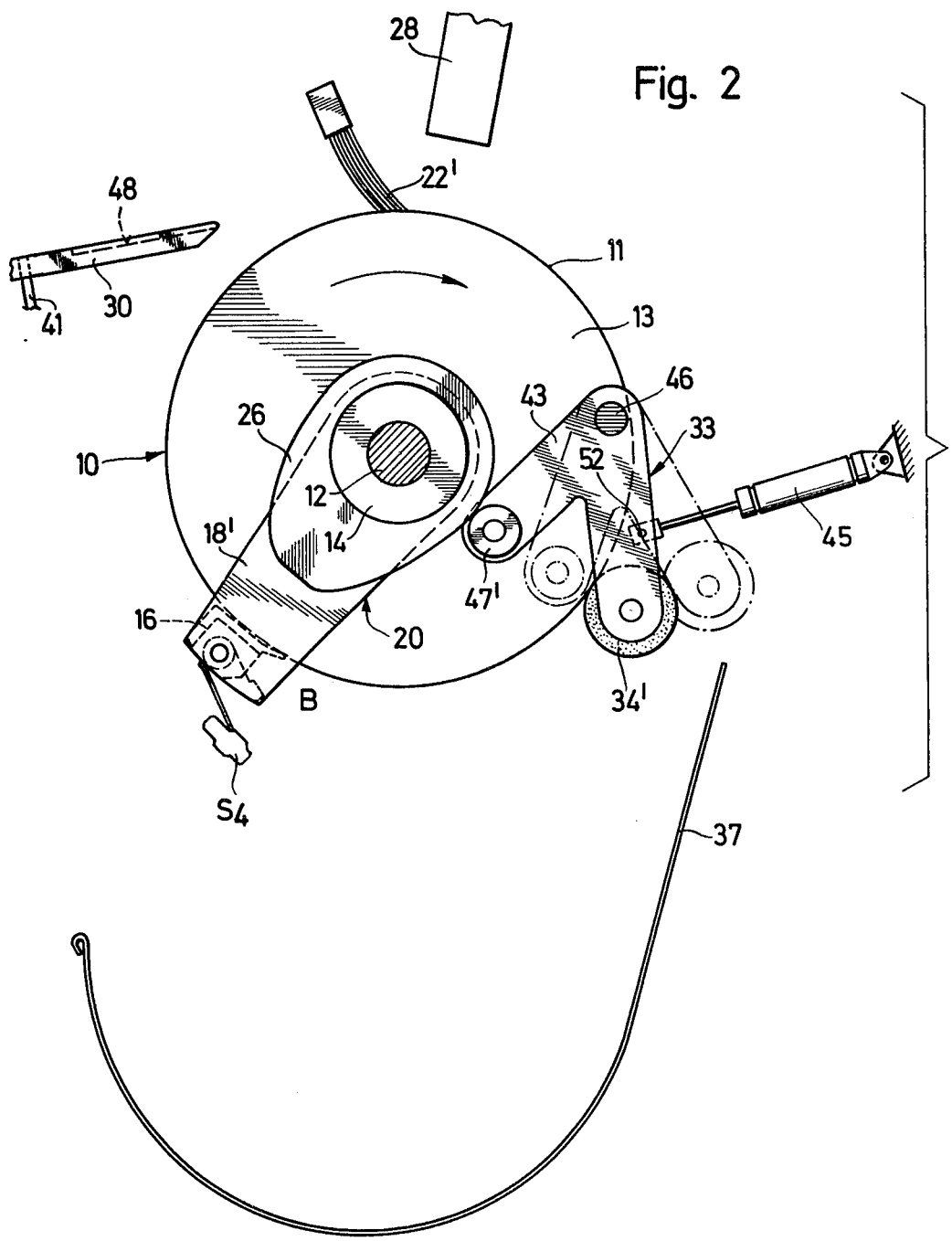

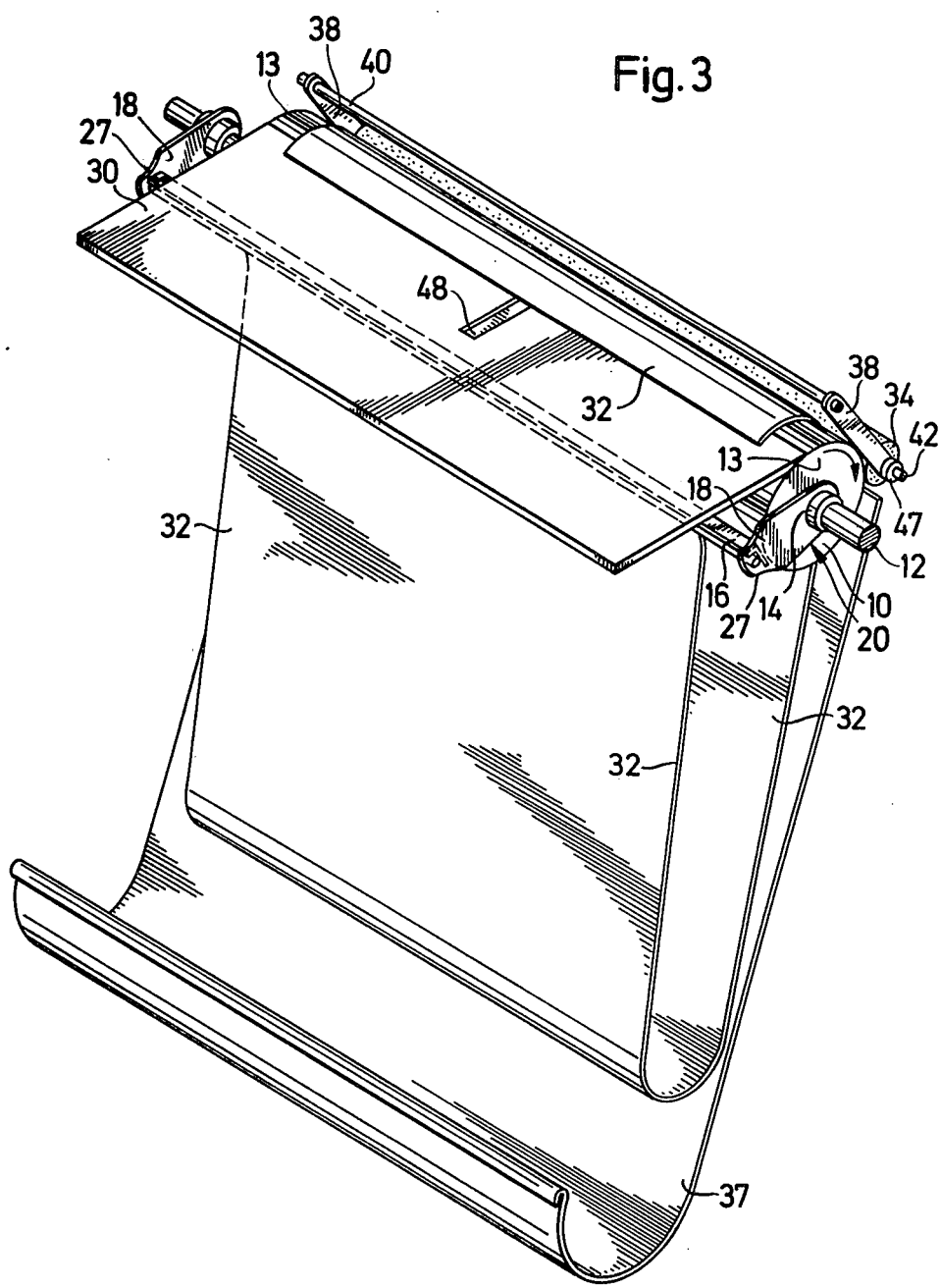

SHEET FEED APPARATUS

BACKGROUND OF THE INVENTION

The invention relates to a sheet feed apparatus and more especially to a paper feed apparatus suitable for use in a photocopying machine wherein an original to be copied is conveyed, by a gripper engageable with the leading edge of the original, through an exposure station and thence along a rotating supporting surface for the original and is discharged at a delivery station after a predetermined number of revolutions around the supporting surface.

German Offenlegungsschrift No. 2,206,063 discloses a sheet feed device for moving documents to be copied through the exposure and projection regions of a copying machine. At the sheet processing point, the feed device comprises a first conveyor unit in the form of a drum which includes a device for holding the leading edge of a sheet to be conveyed, the sheet being movable by a drive mechanism past the sheet processing point and then being capable of being stopped at a predetermined point. A second conveyor unit, consisting of conveyor belts which are provided in the lower region behind the drum, moves the trailing edge of the sheet being thus conveyed past the processing point after its leading edge has stopped. The conveyor belts are endless belts and frictionally engage a sheet present on the drum and displace it relative to the drum after it has stopped. The device for holding the leading edge of an original is a component of the drum and is integrated with it so that when the sheet is stopped, the whole mass of the drum including the holding device must be stopped. When, after stoppage of the drum, the original is further conveyed between the resilient conveyor belts and the drum, the resulting friction leads to abrasion at the back of the original.

A further disadvantage results from the fact that, when the drum is stopped, a heavy contact pressure must be exerted on the original by the resilient conveyor belts in order to obtain adequate friction for further conveying of the original. Since the frictional force between the surfaces of the conveyor belts and the front of the original counteracts the frictional force between the back of the original and the drum, a jerky movement results in the transition phase, which under some circumstances may lead to a so-called "blurred" or shortened copy, wherein straight lines are slightly offset or shortened at a certain point.

German Auslegeschrift No. 1,902,112 discloses a conveyor device for a photocopying machine wherein the original to be copied is supplied individually from a pile to a supporting surface at an exposure station by means of conveyor belts and subsequently conveyed by conveyor belts for deposit on a delivery pile. For this purpose, a first controllable conveyor device takes the separated original and conveys it to the supporting surface by means of a reversible belt conveyor device which is driven by a reversible drive mechanism. This is controlled by a control circuit including a distance measuring device which can be actuated by a switch responding to the separated original and which produces control signals depending on the measured values corresponding to the distances conveyed. In such an apparatus no provision is made for stopping the leading edge of the original. In order to render possible reproduction of long originals, the sheet feed apparatus must be of considerable length so that a compact form of construction is impossible.

Although both known devices fulfill their task, they do not permit the introduction of a second original during the copying of the first original.

SUMMARY OF THE INVENTION

It is an object of the invention to provide an improved sheet feed apparatus.

Another object of the invention is to provide a sheet feed apparatus whereby an original to be copied, the maximum length of which may exceed the length of a supporting surface, can be conveyed as often as desired through the exposure station of a photocopying machine, according to the number of copies required, with a uniform speed over its whole length.

It is also an object of the invention to provide such a sheet feed apparatus wherein it is not necessary to stop the support, e.g., a drum which rotates continuously during a cycle and which is of large mass in comparison with that of the paper gripping device, during the introduction of the original into the sheet feed apparatus, even when the gripping device is stopped to accept the original, thereby obviating braking decelerations and, during re-starting, accelerations of the supporting drum which could easily lead to blurred copies.

In accomplishing the foregoing objects, there has been provided in accordance with the present invention a sheet feed apparatus suitable for feeding an original into a copying machine at an intake position and through the machine past an exposure station, the apparatus comprising a rotary support having a surface for supporting the original, means rotatable with the rotary support for gripping the leading edge of the original, means for selectively coupling and decoupling the gripping means with the support, means in advance of the exposure station for pressing the original against the supporting surface, means associated with the rotary support for conveying the original in contact with the supporting surface when the gripping means is stationary, and means for releasing the original from the gripping means at a discharge position after the support has made a predetermined number of revolutions.

In one embodiment the gripping means comprises one arm on each end of the rotary support and a gripper bar connected between these arms. Preferably, the coupling and decoupling means is electrically operated and includes means for braking the gripping means upon decoupling. In one preferred aspect, the rotary support is a drum mounted on a drive shaft and the arms of the gripping means are mounted on the drive shaft adjacent to the end faces of the drum.

In one embodiment the pressing means comprises at least one brush which is secured in a pivotable frame adjacent the rotary support and compression springs which urge the frame toward the surface of the rotary support. In another embodiment the pressing means comprises a brush which bears under its own weight against the surface of the rotary support.

Preferably the conveyor means is positioned after the exposure station and comprises a pressure roller mounted between two bars pivotably mounted adjacent the rotary support, means for urging the pressure roller against the surface of the rotary support, and means for lifting the conveyor means to allow of passage of the gripper bar beneath it, whereby the pressure roller cooperates with the drum to impart further feed to an original on the surface of the drum in synchronism with the movement of the drum to form a loop after the gripping means is disconnected from the drum and stopped.

The apparatus also comprises control circuitry for timing the operation of the components outlined above.

Other objects, features and advantages of the invention will become apparent from the following detailed description of some preferred embodiments, when considered in light of the attached figures of drawing.

BRIEF DESCRIPTION OF THE DRAWINGS

In the drawings:

FIG. 2 is a similar view of a second embodiment;

FIG. 3 is a perspective view of the embodiment shown in FIG. 1, with certain parts being omitted for clarity;

DETAILED DESCRIPTION OF PREFERRED EMBODIMENTS

Figure 1:
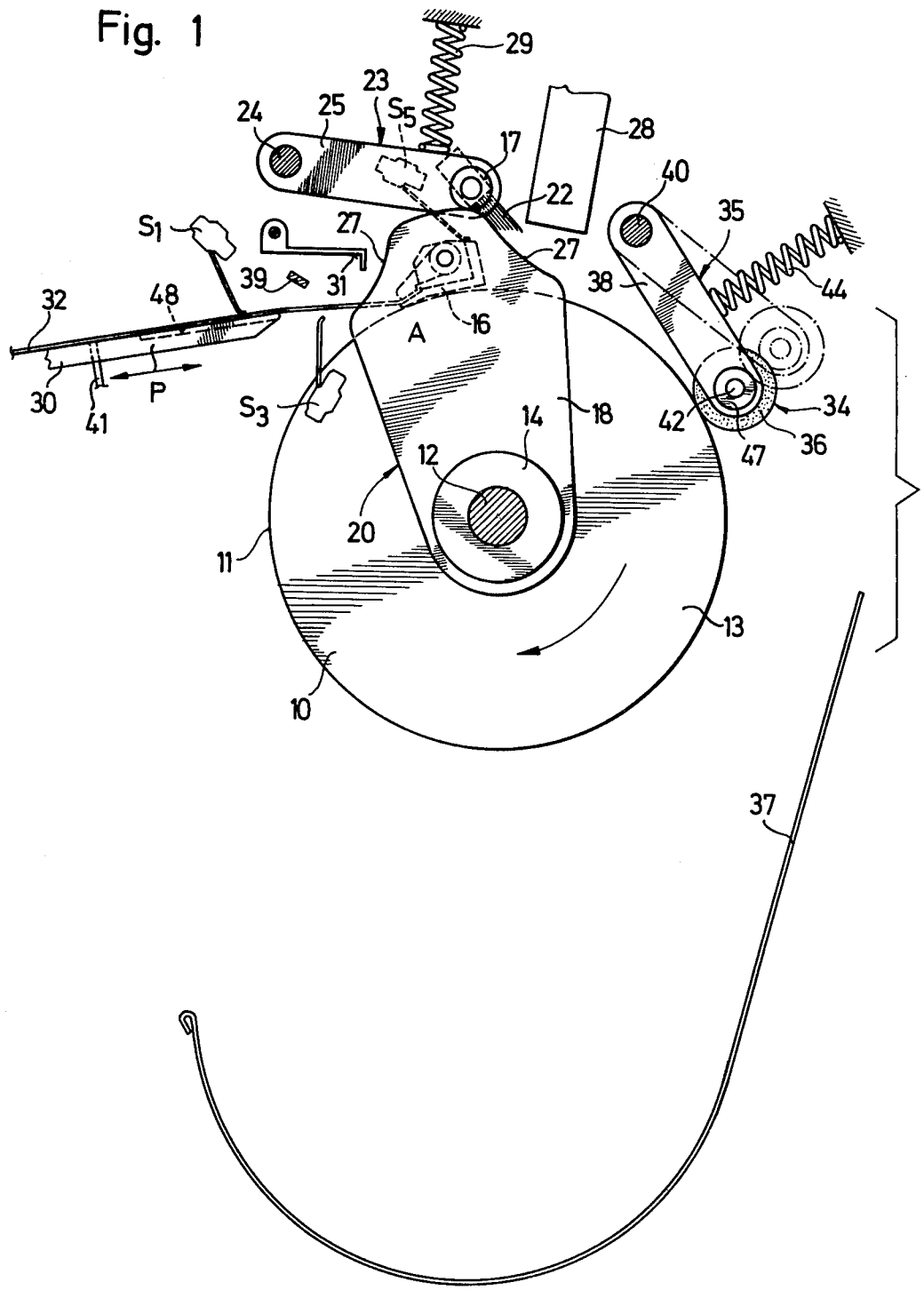
FIG. 1 is a plan view partly in section illustrating one embodiment of the feeding apparatus according to the invention.

The present invention provides a sheet feed apparatus for feeding an original into and through a photocopying machine and past an exposure station. The apparatus comprises a rotary support having a surface for supporting the original, a gripper for the leading edge of the original which is capable of rotation with the support but releasable therefrom to assume a stationary position, means for coupling the gripper to the support and for releasing it therefrom, and a mechanism in advance of the exposure station for pressing the original against the bearing surface, which serves to advance the original when the gripper is stationary and means for releasing the original from the gripper after the support has made a predetermined number of revolutions.

The gripper preferably consists of two arms, a gripper bar and an electrical coupling and braking device for effecting rotation of the gripper with the support or for stopping the gripper while the support continues to rotate. Preferably the support is a drum, on the drive shaft of which the arms of the gripper are mounted adjacent the end faces of the drum.

In one embodiment of the invention, the gripper bar, which extends for the full length of the drum, is secured to ends of the arms which project beyond the surface of the drum and the electrical coupling and braking device is mounted on the drive shaft close to one of the end faces of the drum. The electrical coupling and braking device renders it possible to couple the gripper to the rotating drum or to disengage it as required.

At the ends projecting beyond the drum, the two arms are advantageously constructed in the form of cams for lifting the pressure mechanism and the conveying mechanism from the surface of the drum and for thereafter allowing these mechanisms to bear against said surface. As a result, assurance is provided that, at the correct moment, both the pressure mechanism which serves to press and stretch the original against the cylindrical surface of the drum, and the conveyor mechanism are lifted from the surface to ensure satisfactory passage of the gripper beneath the lifted mechanisms. The pressure mechanism preferably consists of at least one brush secured in a frame pivotable about a pin, and two compression springs engaging the frame to urge the brush against the surface of the drum or against the cams on the gripper. Through the brush, the compression springs ensure constant contact between the original and the surface of the drum so that the original lies flat and optical distortions as a result of unevenness in the original during passage through the exposure station are largely eliminated.

The conveyor mechanism preferably comprises a pressure roller which is rotatably mounted on a shaft journaled between two bars which are pivotably mounted on the ends of the drum. The conveyor mechanism is lifted from the drum upon passage of the gripper bar by the cams on the gripper, and is normally biased by a pressure device against the drum.

In comparison with the sheet conveyor device according to German Offenlegungsschrift No. 2,026,063, the advantage is achieved that only the small mass of the gripper has to be stopped when the original is stopped during its rotation around the drum, or has to be accelerated during re-starting, and not the large mass of the drum. After the gripper is stopped, the conveyance of a large original between the constantly rotating drum and the pressure roller and the conveyor mechanism is effected in a manner which completely protects the original, because no acceleration occurs and the original is maintained at the speed at which it was travelling at the moment the gripper is stopped. In addition, no problems arise with the synchronous speed of the original during a repeated run through the machine, i.e., the uniform speed of the original over its whole length, because first the leading edge of the original is conveyed through under the pressure roller by the rotating gripper and the following immediate infeed of the pressure roller against the drum is effected before the gripper is opened. In this manner, assurance is provided that a completely uniform transport of the original takes place between the drum and the pressure roller. Because the drum rotates continuously, a slight contact pressure of the pressure roller on the original is sufficient to obtain an adequate frictional connection for further conveying. Jerky movement during further conveying of an arrested original is therefore largely eliminated.

Two specific embodiments of the invention will now be described, by way of example, with reference to the accompanying schematic drawings.

The apparatus illustrated in FIGS. 1 and 3 includes a drum 10, having a cylindrical surface 11 and mounted on a continuously rotating drive shaft 12. As explained below, an original 32 to be copied passes in succession to a pressure mechanism 23 and then to a conveyor mechanism 35. A gripping device 20, which includes two arms 18 joined by a gripper bar 16, is supported on the shaft 12 at the lower ends of the arms 18 close to the end faces 13 of the drum 10. An electrical clutch 14, which also acts, when disengaged, as a brake, is functionally interposed between one arm 18 and the shaft 12. The clutch 14 couples the gripping device 20 to and uncouples it from the shaft 12 pursuant to a control program, and thus determines periods when the gripper bar 16 is at rest or is rotating with the drum 10.

At the beginning of a cycle of the control program, the gripping device 20 occupies an intake position A close to and slightly in advance of the apex of the drum 10. The original 32 to be copied is pushed into the apparatus by the operator along a feed table 30. The table 30 can be moved in opposite directions as indicated by the double arrow P in FIG. 1. As the original is advanced along the table 30, its leading edge engages and lifts the tongue of a switch S₁. Manual advance of the original is arrested by the angled lower edge of a stop 31, which at this stage occupies the lowered position shown in FIG. 4a in which it rests on a support 39. The stop 31 is pivoted on a shaft and can be raised and lowered under control of an electromagnet or an electric motor (not shown). The angled lower end of the stop 31 provides for precise alignment of the leading edge of the original 32 by the operator. As soon as such alignment has been effected, the operator actuates a switch $S_2$ (FIG. 5), for example a foot switch, to apply suction to nozzles 41 in the table 30 and so hold the original 32 to the table. After a predetermined time delay, the stop 31 is raised, and the table 30 is then advanced automatically toward the drum 10 to introduce the leading edge of the original 32 into open jaws of the gripper bar 16. During its advance, the table 30 actuates a switch $S_3$, which is disposed beneath the table 30 close to the surface of the drum 10 to cause, (1) closure of the jaws of the gripper bar 16 (see FIG. 4b) after a predetermined time delay, (2) removal of suction from the nozzles 41 and (3) engagement of the clutch 14 to the drive shaft 12, so that one arm 18 of the gripping device 20 is coupled to the shaft 12. At the same time, the table 30 returns to its initial position.

Figure 4A:
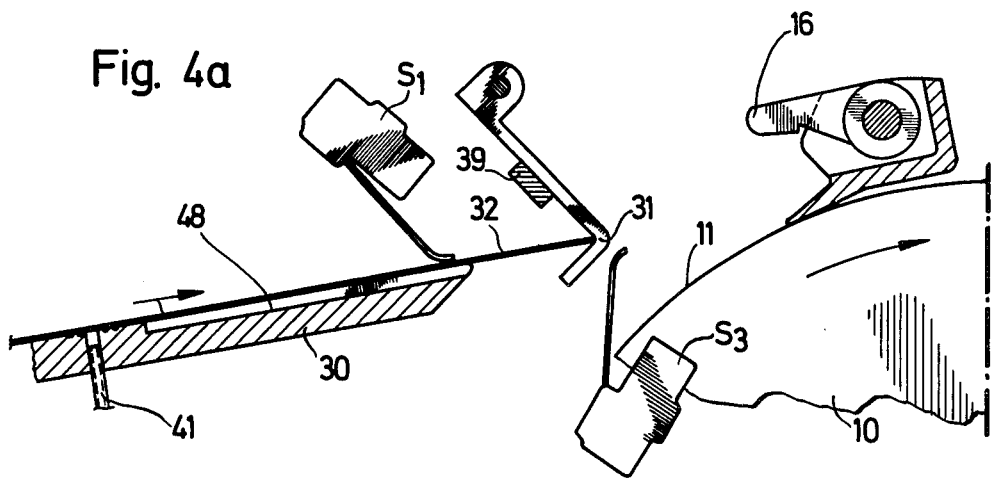
FIG. 4a–4c are enlarged detail plan views showing successive stages in the advance of an original through the apparatus of the invention.
Figure 4B:
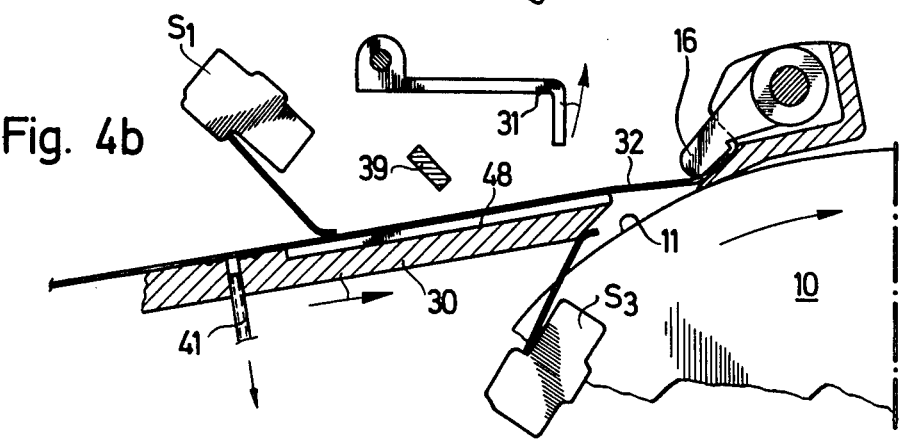
Figure 4C:
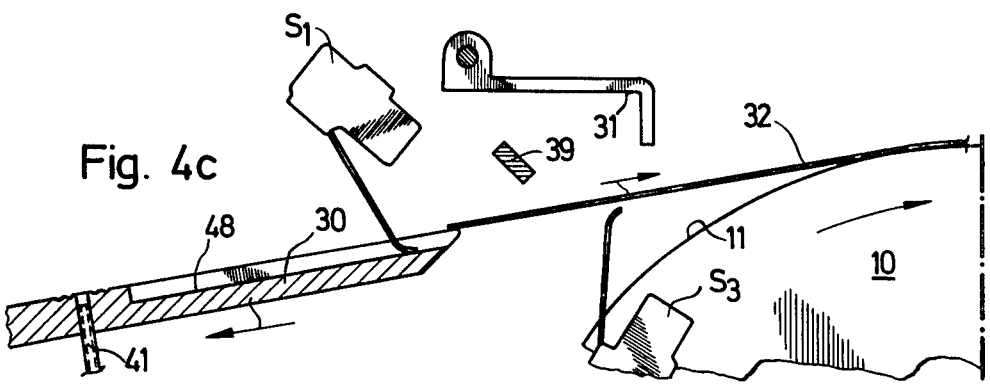

The original is accordingly carried by the gripping device 20 over the surface 11 of the drum 10 as shown in FIG. 4c.

Cams 27 on the upper ends of the arms 18 cooperate with the pressure mechansim 23 and the conveyor mechanism 35 to lift each respectively from the surface 11 of the drum 19 and to allow them to return into contact with the surface 11.

The pressure mechanism 23 comprises a frame 25, which is pivoted on a shaft 24 mounted in the housing of the photocopying apparatus. At the end remote from the shaft 24, the frame 25 carries cam rollers 17 which coact with the cams 27 during the passage of the gripping device 20 and ensure gentle lifting and lowering of the pressure mechanism 23 onto the surface of the drum 10. The pressure mechanism 23 also carries one or more brushes 22, which extend for the width of the frame 25 between the cam rollers 17 and bear against the original 32 to press it smoothly and without the formation of folds against the surface of the drum 10 and to impose tension on it. The pressure mechanism 23 is urged downwardly by one or two compression springs 29 which, when the pressure mechanism is lowered, cause the brushes 22 to exert downward pressure on the original 32. Alternatively, the pressure mechanism 23 may be disposed above the apex of the drum 10 and the spring 29 may be omitted, provided the weight of the frame 25 exerts sufficient pressure on the brushes 22 to ensure smoothing of the original 32.

Beyond the pressure mechanism 23 is an exposure station 28, where an image of the original 32 is projected onto an electrically charged photoconducting drum (not shown) in the photocopying apparatus.

Beyond the exposure station 28 is the conveyor mechanism 35, which comprises two bars 38 pivoted on a shaft 40 and joined by a shaft 42 on which a pressure roller 34 is rotatably mounted. Outside of the bars 38, the shaft 42 also carries cam rollers 47 which coact with the cams 27. The roller 34 has a resilient surface layer 36 which bears against the surface of the drum 10. One or more compression springs 44 urge the bars 38 toward the surface of the drum 10, which imparts a friction drive to the pressure roller 34 through the interposed original when the conveyor mechanism is in the lowered position. The original 32 is therefore pressed smoothly against the surface of the drum 10 by the roller 34 and is carried forward by the drum, regardless of whether its leading edge is engaged by or released from the jaws of the gripper bar 16. A pneumatic or hydraulic cylinder could be used as a pressure device instead of the springs 44. It is also possible to dispense with the springs 44 provided the weight of the frame 38 is sufficient to cause the roller 34 to apply adequate pressure to the original supported on the drum.

Below the drum 10 is a curved discharge trough 37 into which the original 32 is introduced when the jaws of the gripper bar 16 have opened after arrival of the gripping device 20 at its discharge position B (see FIG. 2), which in the embodiment illustrated is at an angular spacing of some 230° from the apex of the drum. The trough 37 also receives the loop formed by the original 32 which results from the fact that the roller 34 continues to convey the original 32 in synchronism with the movement of the drum 10 after the gripping device 20 has stopped in the discharge position B, before the jaws of the gripper bar 16 have been opened.

The gripping device 20 is retained in position B as explained below in response to a switch $S_4$ close to the discharge position B and the surface of the drum 10.

In the embodiment shown in FIG. 2, the pressure mechanism 22' consists of a single bar, carrying a brush which bears against the surface 11 of the drum 10 under its own weight. The drive shaft 12 of the drum 10 carries two cams 26 which rotate together with the gripping device 20. The gripping device 20 consists of two arms 18' which are disposed close to the end faces of the drum 10 on the drive shaft 12, and one of which is releasably connected to the shaft 12 via the clutch 14. The projecting ends of the arms 18' carry no cams. A cam roller 47' forming part of the conveyor mechanism 33 coacts with the peripheral surfaces of the cams 26. The conveyor mechanism includes two bell cranks 43 which are rotatably mounted on pins 46 and which are disposed outside the end faces of the drum 10 and carry a pressure roller 34' having a resilient surface. The position of the bell cranks 43 when the roller 34' is in the operative position is illustrated in full lines and the raised position is illustrated in phantom lines. The bell cranks 43 carry at one end the cam rollers 47' and at the other end a pressure roller 34' which has a resilient coating. This roller 34' runs on the surface 11 of the drum 10. The conveyor mechanism 33 is urged towards the surface of the drum 10 by a pneumatic or hydraulic cylinder 45, the piston rod of which is pivoted to a transverse rod 52 connecting the bell cranks 43. The cylinder 45 may be replaced by at least one compression spring which presses the bell cranks 43 and the cam rollers 47' against the cams 26 and the roller 34' against the surface 11 of the drum 10. The pressure exerted by the pressure device must be such that the rotating cams 26 can lift the bell cranks 43 from the surface of the drum 10 without difficulty so as not to impede the passage of the original 32. ;p The gripper bar 16 is supported on its axis in the ends of the arms 18 or 18' which project beyond the drum 10 and the bar extends for the full length of the drum 10.

The gripping device 20 is stopped close to the apex of the drum 10 when in the intake position A for the original 32 and is situated 180°–230° from the apex when in the discharge position B.

Figure 5:
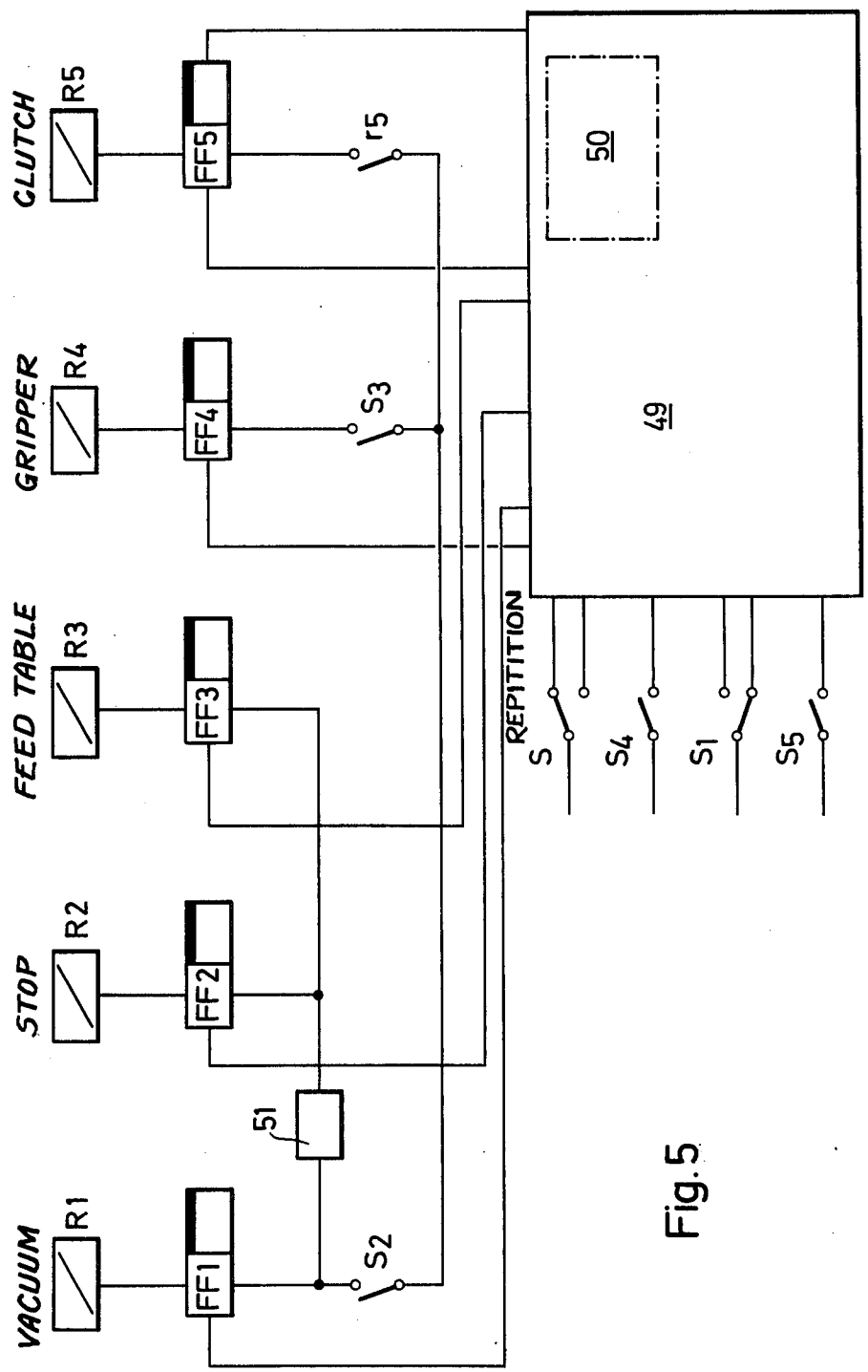
FIG. 5 is a circuit diagram of the program cycle of the sheet feed apparatus of the invention.

As shown in FIG. 5, the switch $S_2$ is connected through a delay circuit 51 to flip-flops $FF_2$, $FF_3$ which control respective relays $R_2$, $R_3$. The relay $R_2$ serves to actuate the electric motor or electromagnet which imparts pivotal movement to the stop 31. The relay $R_3$ serves to advance the feed table 30 until the switch $S_3$ is actuated. The switch $S_2$ is also connected, through a flip-flop $FF_1$, to a relay $R_1$ which controls the supply of suction as well as the disconnection of suction from the nozzles 41 in the feed table 30. Actuation of the switch $S_3$ (1) actuates a flip-flop $FF_4$ to cause a relay $R_4$ to close the jaws of the gripper bar 16 to engage the leading edge of the original 32, (2) cuts off suction from the nozzles 41 via the delay circuit 51 after a certain time delay and (3) actuates a flip-flop $FF_5$ to cause a relay $R_5$ to engage the clutch 14 to couple one of the arms 18 or 18' of the gripping device 20 to the drive shaft by engaging the clutch 14. The switches $S_1$, $S_4$ and $S_5$ also control, through a programmed switching logic 49, the flip-flops $FF_4$, $FF_5$ and the associated relays $R_4$, $R_5$ according to the programming of the switching logic 49. Actuation of the switch $S_4$ by the gripping device 20 when it reaches the discharge position B, disengages the clutch 14 and opens the jaws of the gripper bar 16 through the logic 49 to release the leading edge of the original 32 which then falls into the discharge trough 37. The logic 49 is also connected to the flip-flops $FF_1$, $FF_2$ and $FF_3$ as shown.

As soon as the trailing edge of the original 32 releases the switch $S_1$, the tongue of this switch engages in a groove 48 (FIG. 4c) in the feed table 30 and the clutch 14 is again engaged under control of the logic 49 to move the gripping device 20 from the discharge position B to the intake position A, in which it is arrested by a signal sent to the logic by the switch $S_5$ (FIG. 1). As will be described in more detail hereinafter, the switch $S_4$ can be electrically overridden, after the trailing edge of the original 32 has released the switch $S_1$ and before the leading edge of the original 32 has reached the discharge position B.

The mode of operation of the sheet feed device is as follows:

A distinction must be made on the one hand between a single copy and multiple copies, which require multiple passages of the original 32 around the drum 10, and on the other hand between originals having a length greater or less than the distance measured along the periphery of the drum from the switch $S_1$ to the discharge position B. Thus, altogether, there are four different possibilities.

In all cases, after preselection of the required number of copies by means of a selector switch S (FIG. 5), the original 32 is pushed under the switch $S_1$ until it bears against the stop 31 (FIG. 4a). Actuation by the operator of the switch $S_2$ causes the original 32 to be drawn against the table 30 by the suction applied to the nozzles 41 and causes the stop 31 to be thereafter moved out of the path of movement of the original 32. The table 30 is then advanced to its forward position (FIG. 4b) to actuate the switch $S_3$, which initiates the closing of the jaws of the gripper bar 16 and, after a time delay, removes suction from the nozzles 41, and engages the clutch 14 to cause the gripping device 20 to rotate and advance the original 32 (FIG. 4c) until the gripping device reaches the discharge position B and actuates the switch $S_4$.

The case of selection of a single copy will be first considered.

If the length of the original exceeds the distance, measured around the periphery of the drum, from the switch $S_1$ to the discharge position B, the switch $S_1$ will remain actuated when the switch $S_4$ is actuated because the original continues to prevent the tongue of switch $S_4$ from entering the groove 48 in the table 30. If, on the other hand, the length of the original is less than the above-mentioned distance, the switch $S_1$ will have become deactuated by entry of its tongue into the groove 48 by the time the switch $S_4$ is actuated.

In the former case, the switch $S_1$ controls the logic 49 so that actuation of the switch $S_4$ causes the jaws of the gripper bar 16 to open and disengages the clutch 14 to arrest the gripping device 20 in position B. The pressure roller 34 or 34' cooperates with the drum 10 to discharge the original into the trough 37, and when the trailing edge of the original has cleared the switch $S_1$, this switch causes the logic 49 to re-engage the clutch 14 to move the gripping device 20 to position A, at which it actuates the switch $S_5$ to effect disengagement of the clutch 14. At the same time, the stop 31 is restored to its original position (FIG. 4a) to permit of feeding in of a fresh original.

In the latter case, i.e., when the switch $S_1$ is deactuated at the time of actuation of the switch $S_4$, the jaws of the gripper bar 16 are opened as before at position B but the switch $S_4$ is overridden by the switch $S_1$ to the extent that the logic 49 does not de-energize the clutch 14 and the gripping device continues to travel to position A, where it is stopped and braked by actuation of the switch $S_5$. In this sequence it does not stop at position B.

When the selector switch S is positioned to select multiple copies, the action of the logic is modified so that actuation of the switch $S_4$ is ineffective to open the jaws of the gripper bar 16 until the last run of the original through the machine. As in the case of single copies, the length of the original determines whether the switch $S_1$ is actuated or not when the gripping device 20 reaches position B and actuates the switch $S_4$. In the case of a long original, the gripping device 20 is stopped at each cycle at position B until the trailing edge of the original has cleared the switch $S_1$. In the case of a short original, since the switch $S_1$ is already deactuated when the switch $S_4$ is actuated, the gripping device is not stopped at position B but proceeds directly to position A.

During multiple copying, the gripping device is stopped at position A at each cycle and is restarted in rotation by a pulse after completion of each copy.

The first run-through time of the original 32 from the commencement of movement of the gripping device 20 to actuation of the switch $S_1$ by the trailing edge of the original 32 is stored by a computer 50 in the logic 49 and used as a measurement quantity for the subsequent runs of the original to make further copies. This is necessary because, during subsequent runs, the original travels between the surface of the drum 10 and the undersurface of the table 30, and its trailing edge has no effect on the switch $S_1$. The measurement quantity is therefore used instead for length control during the further runs.

It is also possible to provide for overriding of the switches $S_4$ and $S_5$ on each run during multiple copying so that the gripping device is not stopped either in the discharge position B or in the intake position A, but rotates continuously without stopping. In this case, during the last run of the original 32, the gripper bar 16 is opened in the discharge position B and the original is discharged into the discharge trough 37. The gripper device 20 passes through the discharge position B without stopping and is stopped in the intake position A by the switch $S_5$. During the course of this, the stop 31 is restored to its initial position (FIG. 4a) so that the sheet feed apparatus is ready for another programmed cycle with an original.

During multiple copying, the table 30 remains in its starting position after the first run of the original. It is therefore possible to align a second original with the stop during further runs of the first original, the second original being held to the table by application of suction to the nozzles 41. After the last run of the first original and its discharge, the table advances to feed the leading edge of the second original into open jaws of the gripper bar and these are automatically closed by a pulse stored in the logic 49, without it being necessary for the operator to actuate the switch $S_2$. The number of copies to be made from the second original must be selected by the switch S before the program cycle for the second original starts.

Gripping of the second original by suction during the copying of a first original saves the dead time necessitated by manual infeed of the originals and renders possible a high throughput of copies while retaining an optimum efficiency.

What is claimed is:

1. A sheet feed apparatus suitable for feeding an original into a copying machine at an intake position and through the machine past an exposure station, said apparatus comprising a rotary support having a surface for supporting the original, means selectively rotatable with said rotary support and including selectively closable jaws for gripping the leading edge of the original, means for selectively coupling and decoupling said gripping means for rotation with said support, means in advance of the exposure station for pressing the original against the supporting surface, means associated with said rotary support for conveying the orginial in contact with said supporting surface when the gripping means is stationary, and means for releasing the original from the gripping means for releasing the original from the gripping means at a discharge position after the support has made a predetermined number of revolutions, whereby multiple revolutions of an original and particularly one which is longer than the surface of the rotary support are possible.

2. The sheet feed apparatus as claimed in claim 1, wherein said rotary support is a drum mounted on a drive shaft, wherein said gripping means comprises one arm mounted on the drive shaft adjacent to each end face of the drum and a gripper bar connected between said arms, and wherein said coupling and decoupling means is electrically operated and includes means for braking said gripping means upon decoupling.

3. The sheet feed apparatus as claimed in claim 1, wherein said coupling and decoupling means further includes means for selectively stopping the gripping means in an intake position adjacent the apex of the rotary support for the insertion of the original and in a discharge position, spaced from the apex by an angular distance of between about 180° to 230°, for discharge of the orginial.

4. The sheet feed apparatus as claimed in claim 1, further comprising a movable feed table for advancing the original toward the rotary support, pivotable stop mounted in advance of the table for aligning the leading edge of the original, and a first switch in cooperative contact with said feed table and positioned to be actuated by the leading edge of the original as it is advanced toward the rotary support.

5. A sheet feed apparatus suitable for feeding an original into a copying machine at an intake position and through the machine past an exposure station, said apparatus comprising a rotary support having a surface for supporting the original, means rotatable with said rotary support for gripping the leading edge of the original, means for selectively coupling and decoupling said gripping means with said support, means in advance of the exposure station for pressing the original against the supporting surface, means associated with said rotary support for conveying the original in contact with said supporting surface when the gripping means is stationary, and means for releasing the original from the gripping means at a discharge position after the support has made a predetermined number of revolutions, wherein said rotary support is a drum mounted on a drive shaft and wherein said gripping means comprises one arm mounted on the drive shaft adjacent to each of the end faces of the drum and a gripper bar connected between said arms, and wherein said coupling and decoupling means is electrically operated and includes means for breaking said gripping means upon decoupling.

6. The sheet feed apparatus as claimed in claim 5, wherein the gripper bar is secured to the ends of the arms which project beyond the surface of the drum and the electrical coupling and braking means are mounted on the drive shaft close to one of the end faces of the drum.

7. The sheet feed apparatus as claimed in claim 6, including means for lifting the pressing means and the conveyor means from the surface of the drum and for returning the pressure means and conveyor into contact with said surface after passage of the arms.

8. The sheet feed apparatus as claimed in claim 7, wherein said conveyor means is positioned after the exposure station and comprises a pressure roller mounted between two bars pivotably mounted adjacent said rotary means for urging said pressure roller against the surface of the rotary support, and means for lifting said conveyor means from the drum to allow of passage of the gripper bar beneath it, whereby the pressure roller cooperates with the drum to impart further feed to an original on the surface of the drum in synchronism with the movement of the drum to form a loop after the gripping means is disconnected from the drum and stopped.

9. The sheet feed apparatus as claimed in claim 8, wherein said lifting means comprises cam rollers attached to said bars in such a manner to cooperate with said cams formed at the ends of said arms.

10. The sheet feed apparatus as claimed in claim 8, wherein said urging means includes two compression springs, each of which bears against one of the bars to urge said pressure roller toward said support surface.

11. The sheet feed apparatus as claimed in claim 7, wherein said lifting and returning means comprises cam surfaces formed at the end of each arm which projects beyond the surface of the drum.

12. The sheet feed apparatus as claimed in claim 7, wherein said lifting and returning means comprises two cam plates which are mounted on the drive shaft of the rotary support and which coact with cam rollers mounted on the conveyor means.

13. The sheet feed apparatus as claimed in claim 12, in which the conveyor mechanism comprises two bell cranks pivotably mounted adjacent said rotary support, each bell crank having a cam roller on one end and supporting one end of said pressure roller at the other end, and means for urging said pressure roller against the surface of the rotary support.

14. The sheet feed apparatus as claimed in claim 13, wherein said urging means comprises a fluid-actuated cylinder having a piston rod pivotably connected to the conveyor means.

15. The sheet feed apparatus as claimed in claim 6, wherein the pressing means comprises at least one brush which is secured in a pivotable frame adjacent said rotary support and compression springs which urge the frame toward the surface of the rotary support.

16. The sheet feed apparatus as claimed in claim 5, wherein said pressing means comprises a brush which bears under its own weight against the surface of the rotary support.

17. A copying machine, comprising the sheet feed apparatus as defined by claim 5.

18. The sheet feed apparatus as claimed in claim 5, wherein said coupling and decoupling means further includes means for selectively stopping the gripping means in an intake position adjacent the apex of the rotary support for the insertion of the original and in a discharge position, spaced from the apex by an angular distance of between about 180° to 230°, for discharge of the original.

19. The sheet feed apparatus as claimed in claim 5, further comprising a movable feed table for advancing the original toward the rotary support and a pivotable stop mounted in advance of the table for aligning the leading edge of the original.

20. The sheet feed apparatus as claimed in claim 19, further comprising a first switch positioned to be actuated by the leading edge of the original as it is advanced toward the rotary support.

21. A sheet feed apparatus suitable for feeding an original into a copying machine at an intake position and through the machine past an exposure station, said apparatus comprising a rotary support having a surface for supporting the original, means rotatable with said rotary support for gripping the leading edge of the original, means for selectively coupling and decoupling said gripping means with said support, means in advance of the exposure station for pressing the original against the supporting surface, means associated with said rotary support for conveying the original in contact with said supporting surface when the gripping means is stationary, means for releasing the original from the gripping means at a discharge position after the support has made a predetermined number of revolutions, a movable feed table for advancing the original toward the rotary support, a pivotable stop mounted in advance of the table for aligning the leading edge of the original, a first switch positioned to be actuated by the leading edge of the original as it is advanced toward the rotary support, suction nozzles in said feed table, a second switch associated with said apparatus, and means for applying suction to the nozzles responsive to actuation of said second switch.

22. The sheet feed apparatus as claimed in claim 21, further comprising a plurality of first flip-flop circuits, a time delay circuit, through which said second switch is connected to said first flip-flop circuits, first relays controlled by said first flip-flop circuits for moving the stop out of the path of movement of the table and for advancing the table, and a third switch which is disposed in the path of movement of the table close to the surface of the drum.

23. The sheet feed apparatus as claimed in claim 22, comprising means reponsive to actuation of the third switch for initiating closing of the gripper bar upon the leading edge of the original, for removing suction from the suction nozzles after a time delay and for energizing the coupling and decoupling means to couple said gripping means to the drum for rotation therewith.

24. The sheet feed apparatus as claimed in claim 23, further comprising fourth and fifth switches, a programmed switching logic, controllable by the first switch and by said fourth and fifth switches, second flip-flop circuits controlled by the logic, second relays actuated by said flip-flop circuits to open and close the gripper bar and to engage and disengage the coupling and decoupling means according to the programming of the logic.

25. The sheet feed apparatus as claimed in claim 23, wherein the fourth switch is disposed close to the discharge position of the gripping means and is actuated by the gripper, and means connected through said logic and responsive to said fourth switch for causing the coupling and decoupling device to stop the gripper in the discharge position and for opening the gripping means.

26. The sheet feed apparatus as claimed in claim 25, wherein the first switch comprises a tongue which engages in a groove in the table when the trailing edge of the advancing original passes, means responsive to said engagement for causing the coupling and decoupling means to move the gripping means from the discharge position to the intake position, and means responsive to activation of the fifth switch for stopping the gripping means at the intake position.

27. The sheet feed apparatus as claimed in claim 26, further comprising means for electrically overriding the fourth switch after the trailing edge of the original has reached the discharge position.

28. The sheet feed apparatus as claimed in claim 27, further comprising means for electrically overriding the fourth and the fifth switches after the trailing edge of the original has released the first switch and before the leading edge of the original has reached the discharge position.

* * * * *

UNITED STATES PATENT OFFICE
CERTIFICATE OF CORRECTION

Patent No. 4,072,306    Dated February 7, 1978

Inventor(s) Hermann IDSTEIN

It is certified that error appears in the above-identified patent and that said Letters Patent are hereby corrected as shown below:

Column 5, line 35, kindly delete "drum 19" and insert -- drum 10 --;

Column 6, line 63, kindly delete ";p" and begin a new paragraph with "The gripper bar 16...";

Column 9, lines 44/45, kindly delete "for releasing the original from the gripping means"; and Column 12, line 28, after "said", kindly insert -- second --.

Signed and Sealed this

Eighth Day of August 1978

[SEAL]

Attest:

RUTH C. MASON
Attesting Officer

DONALD W. BANNER
Commissioner of Patents and Trademarks